Aug. 21, 1956  J. V. PONTI  2,759,329
MASTER CYLINDER PRESSURE CARTRIDGE UNIT
Filed May 19, 1952  2 Sheets-Sheet 1
*Fig. 1.*
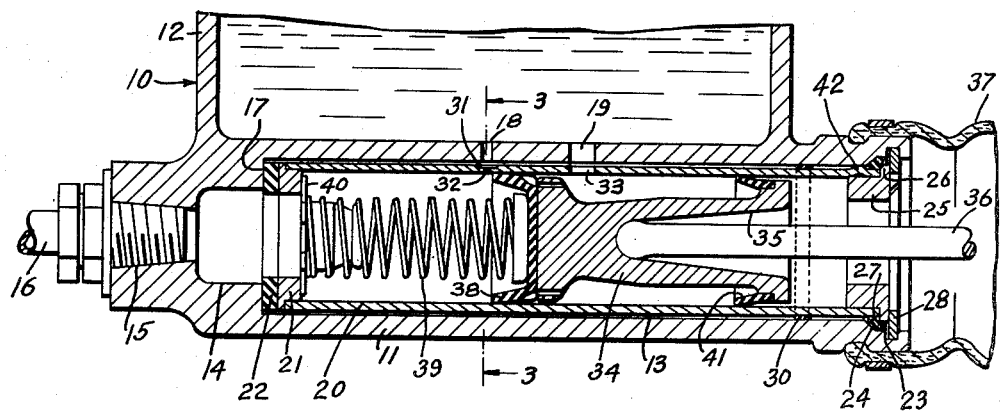
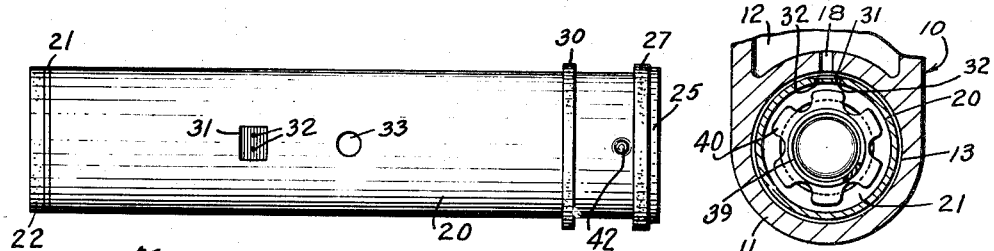
*Fig. 2.*  *Fig. 3.*
*Fig. 4.*
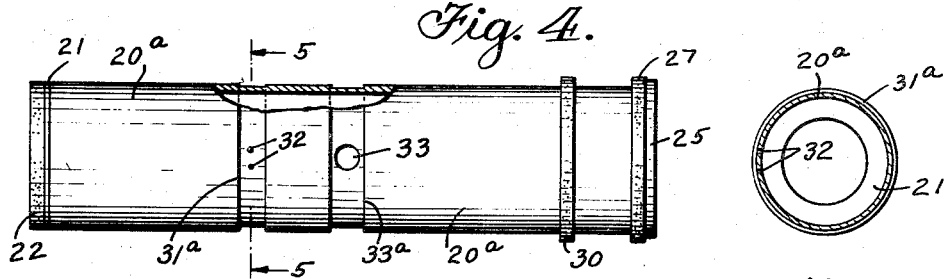
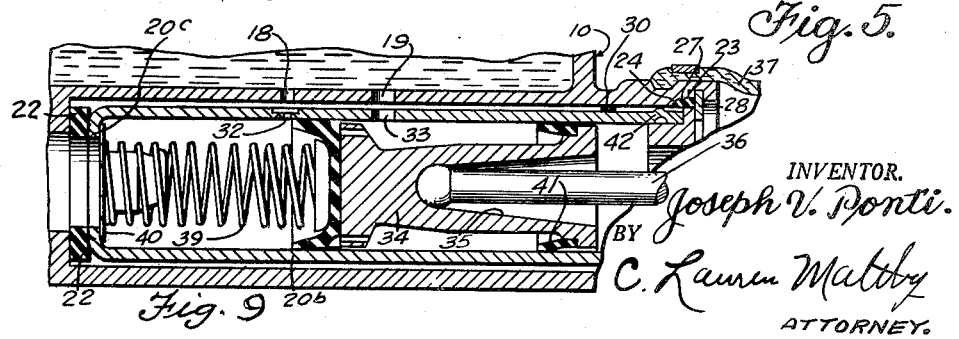
*Fig. 9.*
INVENTOR.
Joseph V. Ponti.
BY C. Lauren Maltby
ATTORNEY.

Aug. 21, 1956  J. V. PONTI  2,759,329
MASTER CYLINDER PRESSURE CARTRIDGE UNIT
Filed May 19, 1952  2 Sheets-Sheet 2
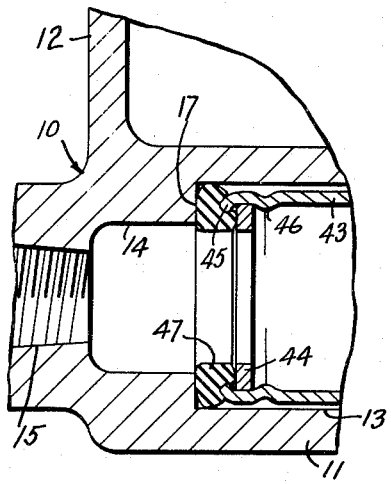
Fig. 6.
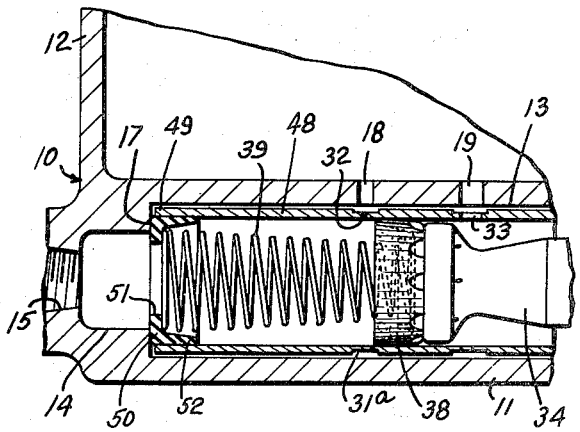
Fig. 7.
Fig. 8.
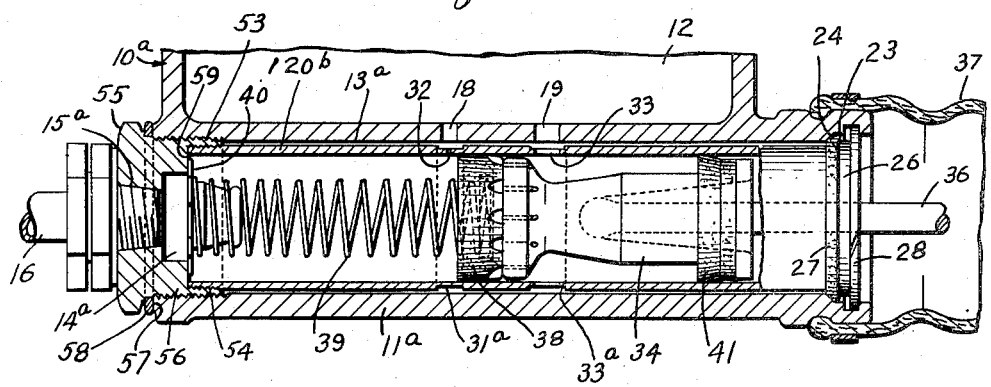
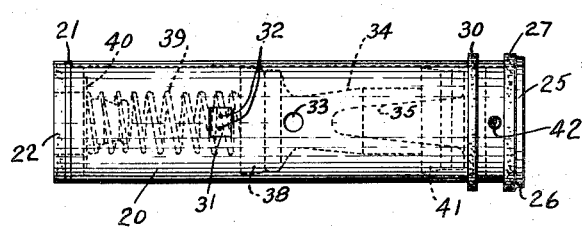
Fig. 10.
INVENTOR.
Joseph V. Ponti.
BY
C. Lauren Malsby
ATTORNEY.

2,759,329
MASTER CYLINDER PRESSURE CARTRIDGE UNIT

Joseph V. Ponti, Los Angeles, Calif.

Application May 19, 1952, Serial No. 288,702

2 Claims. (Cl. 60—54.6)

This invention relates to pressure apparatus, and more especially to master cylinder pressure cartridge units.

The cylinders of pumps and plunger devices, as is well known, are made of steel of proper consistency for lubrication and sealing purposes, however, such cylinders are customarily mounted upon or in structures of cheaper and less expensive material such as cast iron, portions of which may be large to provide fluid reservoirs and passageways. In such types of apparatus it has heretofore been difficult to provide adequate fluid seals between the steel cylinder and the mounting structure or connected pipes, tubing or other passages for the inlet and outlet flow of fluid actuated by the piston. This difficulty is particularly well known in connection with the master cylinders of motor vehicle brake systems, with which the present invention is shown by way of illustration, but is not limited to apparatus as disclosed herein.

It is therefore an object of the invention to provide improved means and pressure apparatus for effecting a fluid seal between the acting cylinder and the associated mounting parts and connected passageways.

Another object of the invention is to provide an improved mounting for a piston actuated cylinder wherein the effectiveness of the fluid seal of the discharge opening of the cylinder is a function of the pressure created by the piston.

Another object of the invention is to provide a simple construction of a cylinder within a shell or casing wherein an effective fluid seal between the cylinder and casing is effected by and is proportional to the pressure of the piston in the cylinder.

An additional object of the invention is to provide a replacement piston and cylinder unit for a comparatively fixed casing wherein the replacement can be effected quickly and easily, and a complete effective fluid seal is made between the cylinder and the casing or discharge passageways connected thereto.

Other objects and advantages will appear and be brought out more fully in the following specification, reference being had to the accompanying drawing wherein:

Fig. 1 is a view in longitudinal sectional elevation of the master cylinder of a motor vehicle brake system showing an embodiment of my invention.

Fig. 2 is a separate plan view of the cylinder shown in Figure 1.

Fig. 3 is a sectional view taken along the line 3—3 of Figure 1.

Fig. 4 is a side elevation view of a modified form of cylinder similar to Figure 2.

Fig. 5 is a sectional view taken along the line 5—5 of Figure 4.

Figures 6 and 7 are partial sectional views showing modified forms of the invention.

Fig. 8 is a view similar to Fig. 1 showing another modified form of the invention.

Fig. 9 is a fragmentary view in section of another modified form of cylinder end walls.

Fig. 10 is an elevation view of the replacement cylinder parts shown in Fig. 1 comprising a replacement cartridge.

Referring more particularly to the drawing, Figure 1 shows the master cylinder of a motor vehicle brake system comprising a casing 10 of cast iron, aluminum or other suitable material, having a generally cylindrical body portion 11 and reservoir 12 thereabove. Body portion 11 has a cylindrical bore 13 and a reduced bore 14 communicating with a threaded end bore 15 for connection with the discharge or outlet pipe 16 leading to the brake cylinders, there being an annular shoulder 17 adjacent bore 14.

Body 10 is formed with a small aperture 18 and a larger aperture 19 forming gravity passages between reservoir 12 and the interior of bore 13. A tubular member 20 comprises the working cylinder of the master cylinder unit, and is made of steel of proper consistency, and is positioned in bore 13 and has a sufficiently smaller outside diameter than bore 13 to permit an easy slidable fit therein. A flanged ring 21 is secured in the outlet end of cylinder 20 and provides a substantial end wall for cylinder 20. A compressible sealing ring 22 is secured to ring 21 and is positioned against end wall 17 of bore 13. Bore 13 is formed with an annular recess 23 in the enlarged end of the bore, and a tapered shoulder 24 is also formed as shown. A flange ring 25 is secured in the right end of cylinder 20 and has a flange 26 which bears against an O ring resilient sealing member 27 which is seated on tapered shoulder 24. An expansible locking C ring 28 seats in groove 23 and secures the cylinder assembly 20 in bore 13. A resilient packing ring 30 is positioned on cylinder 20 and provides a gravity seal between the cylinder and bore 13 of casing 10. Cylinder 20 has a surface recess 31 and one or more small apertures 32 are formed in the cylinder wall within the recess, and a large aperture 33 is also formed in the cylinder as shown, the structure being such that apertures 32 are normally aligned with aperture 18 of the body 10, and aperture 33 aligned with aperture 19.

The plunger unit comprises a piston 34 having a tapered recess 35 in one end for the usual push rod 36 which extends through ring 25 and a suitable dust guard 37. A primary pressure cup 38 is held against the forward end of piston 34 by a spring 39 which is seated on a check valve 40 which in turn is seated on the inner annular surface of flanged ring 21. Piston 34 has a secondary pressure cup 41 at the right end thereof, as shown. Cylinder 20 is provided with one or more bosses 42 adjacent the right end thereof, which engage bore 13 and serve to center the cylinder in the bore so that the apertures 32 and 33 thereof will be held in alignment with apertures 18 and 19, respectively, of the casing body 10.

The operation of the invention as thus far described is as follows. The replacement unit which includes cylinder 20 and the enclosed piston parts, including piston 34 and spring 39, together with the sealing elements 22, 24 and 30, are assembled and inserted into bore 13 of the body 10 with the apertures of the cylinder approximately aligned with the apertures in the body, as mentioned. In this condition it will be apparent that sealing rings 24 and 30 will provide gravity seals for the right hand end of the cylinder, and that sealing ring 22 will likewise provide a gravity seal for the left hand end of the cylinder. It will also be clear that ring 21 forms the outlet end of the cylinder and is urged against sealing ring 22 by the action of spring 39. When the piston rod is actuated to the left, the piston will be moved to the left, and as soon as primary cup 38 passes apertures 32 the braking pressure will be applied to the fluid in the cylinder and to the brake line 16, and the force of this pressure will be applied to compress seal ring 22 which is the primary seal between the piston and bore 13 of the casing 10, and it will be apparent that with an increase of the piston pressure a more effective seal will be obtained. In the event of wear or breakdown of any of the operating parts, the cylinder unit can be readily removed and replaced, and the condition of the bore 13 of the casing 10 is unimportant since the interior of cylinder 20 is the working surface, and it is unnecessary as is the case with present conventional practice under such circumstances to remove the casing 10 from the vehicle and rebore the working cylinder thereof, or remove a relatively fixed liner and replace it with another, all of which steps become unnecessary with the present invention.

In Figs. 4 and 5 I show a modified form of the invention. In these figures the cylinder 20 is replaced by cylinder 20a which is generally similar to cylinder 20, however, an arcuate groove 31a is provided through which the apertures 32 extend, and a similar groove 33a is provided through which apertures 33 extend. By this construction it is unnecessary to provide means such as bosses 42 to align the apertures of the cylinder with the casing apertures since it will be clear that the grooves 31a and 33a will insure a free flow of brake fluid between the apertures regardless of the position of the cylinder apertures with respect to the casing apertures. These grooves may extend all around the cylinder or only partly or to part of a circle, as may be found necessary or expedient.

In Figure 6 I show a modified form of the end portion of the working cylinder. In this figure the cylinder is indicated at 43 and secures at its forward end an apertured disc 44 which forms the end wall of the cylinder. The cylinder wall is formed with an inwardly turned flange 45 and an internal annular boss 46, which together serve to position the disc in place, and the fit of the disc may be relatively loose if desired. A deformable resilient compressible sealing ring 47 is positioned between the end wall 17 of the body 10 and disc 44, and it will be seen that the sealing ring is deformable around flange 45 and also engages the wall of bore 13. Upon the application of piston pressure in the cylinder, this pressure will be applied against the inner annular surface of disc 44 and force it against sealing ring 47 which will be compressed against end wall 17 and radially against bore 13 and against the outer face of disc 44, thus making an effective fluid seal between cylinder 43 and the bore 13 of casing 10.

In Figure 7 I show another modified form of the cylinder. In this figure the cylinder is indicated at 48 and has a uniform forward end 49 in which is positioned a resilient pressure cup 50 having a central opening 51 and a rearwardly extending flange 52 which is seated within the end 49 of cylinder 48. The outer face of pressure cup 50 is normally held against end wall 17 of bore 13, and a normal sealing contact is made therewith by spring 39 positioned between the cup and pressure cup 38 of piston 34. Upon the application of fluid pressure in the cylinder, pressure cup 50 will be forced against end wall 17 and radially outwardly through flange 52 thereof, and a pressure seal will be effected between cylinder 20 and bore 13.

In Figure 8 I show another modified form of cylinder. In this figure I show a modified body or casing 10a having a through bore 13a which has a threaded opening 53 at the forward end. The cylinder 120b is suitably secured as by threaded connection 54 to a plug 55 which has a threaded portion 56 for engagement with threads 53 of the body 10a. Body 10a has a shoulder 57 against which a sealing ring 58 is positioned and secured by tightening action of the plug 55 in its threaded connection. Plug 55 has a threaded end bore 15a, as in Figure 1, and an internal face 59 against which valve 40 rests. The cylinder 20a is formed with annular grooves 31a and 33a having apertures 32 and 33, as in Figures 4, 5 and 7. In Figure 8 the closure for the right hand end of the cylinder may be optional since the cylinder is placed in bore 13a from the left hand end, being secured substantially permanently to plug 55.

In Figure 9 I show another modified form of cylinder 20b which is tubular and has an apertured end wall 20c which is formed as a flange portion of the cylinder wall itself. A compressible resilient sealing ring 22 is secured on flange 20c and the cylinder includes the piston elements similar to Figure 1.

In Figure 10 I show the replaceable unit or cartridge for the master cylinder of a motor vehicle brake system which comprises the cylinder 20 of Figure 1 together with the sealing rings 22, 27 and 30. This replacement unit includes the piston 34, spring 39 and valve 40 and can be inserted as an unit in the bore 13 of a master cylinder casing without necessitating reboring the casing or doing any machine work.

It will be understood that the foregoing description is illustrative rather than restrictive of the invention and that changes and modifications may be made without departing from the spirit and scope of the subjoined claims.

Having described my invention what I claim and desire to secure by Letters Patent is:

1. A self-contained cartridge unit for a master cylinder of a hydraulic brake system having an open end with an annular recess in the cylinder wall adjacent thereto and a closed end provided with a discharge port comprising: a cylindrical shell having a pair of radial openings therein, said shell being continuous except for said openings: said openings providing communication with a fluid reservoir; a piston reciprocable entirely within said shell; said shell having an exhaust end provided with an internally extending annular shoulder; a coil spring in said shell between said piston and said shoulder; sealing means carried by said exhaust end of said shell; said sealing means being firmly seated against said closed end of said cylinder when said shell is in position; said shell having an open end adapted to receive the push rod of said brake system; a snap ring engageable in said annular recess, abutting said open end of said shell, holding said shell against said closed end of said cylinder and preventing movement of said shell in said cylinder.

2. A self-contained cartridge unit for a master cylinder of a hydraulic brake system having an open end with an annular recess in the cylinder wall adjacent thereto and a closed end provided with a discharge port comprising: a cylindrical shell having a pair of radial openings therein, said shell being continuous except for said openings; said openings providing communication with a fluid reservoir; a piston reciprocable entirely within said shell; said shell having an exhaust end provided with an internally extending annular shoulder; a coil spring in said shell between said piston and said shoulder; sealing means carried by said exhaust end of said shell; said sealing means being firmly seated against said closed end of said cylinder when said shell is in position; said shell having an open end adapted to receive the push rod of said brake system; a snap ring engageable in said annular recess, abutting said open end of said shell, holding said shell against said closed end of said cylinder and preventing movement of said shell in said cylinder; said shell having sealing means adjacent its open end for sealing contact with said cylinder.

References Cited in the file of this patent

UNITED STATES PATENTS

| | | |
|---|---|---|
| 2,156,205 | Swift | Apr. 25, 1939 |
| 2,232,349 | Swift | Feb. 18, 1941 |
| 2,311,787 | Swift | Feb. 23, 1943 |
| 2,322,009 | Fowler | June 15, 1943 |
| 2,580,850 | Seppmann | Jan. 1, 1952 |

FOREIGN PATENTS

| | | |
|---|---|---|
| 409,197 | Great Britain | Apr. 26, 1934 |